Jan. 15, 1935.  R. N. GEFFROY  1,987,676
ENGINE MOUNTING FOR TRACTOR ENGINES
Filed Nov. 6, 1933  2 Sheets-Sheet 2
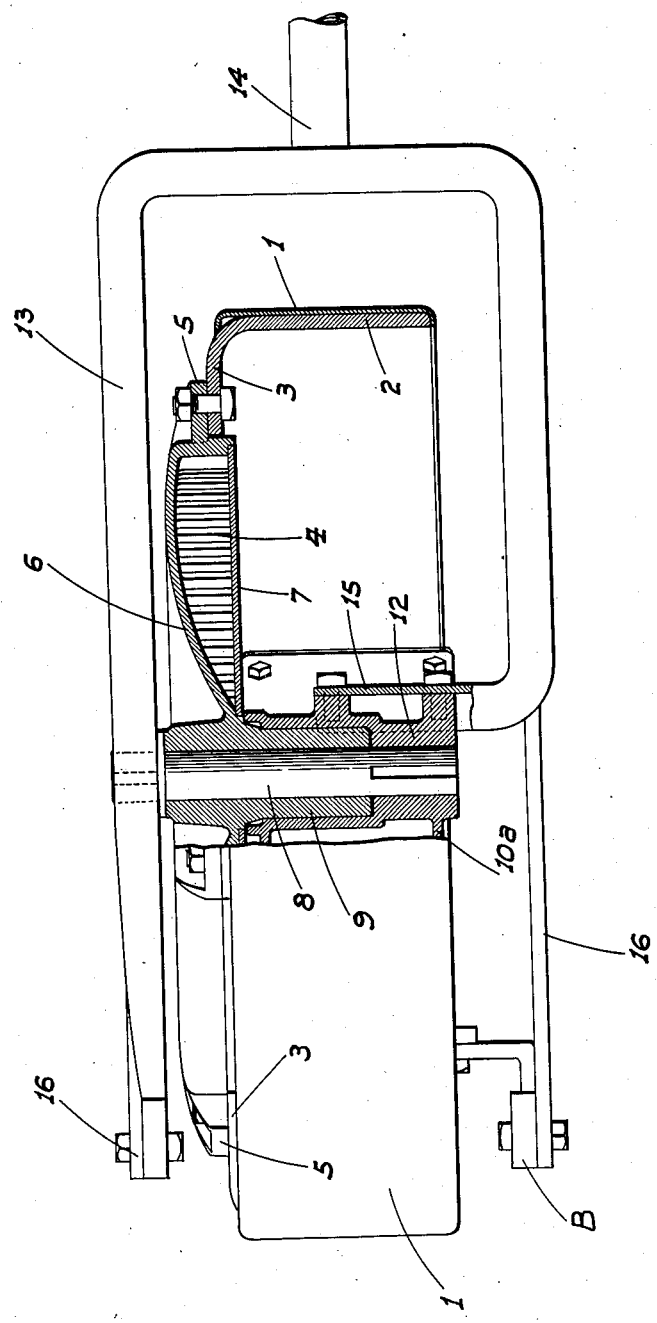
INVENTOR
R.N. Geffroy
BY
ATTORNEY

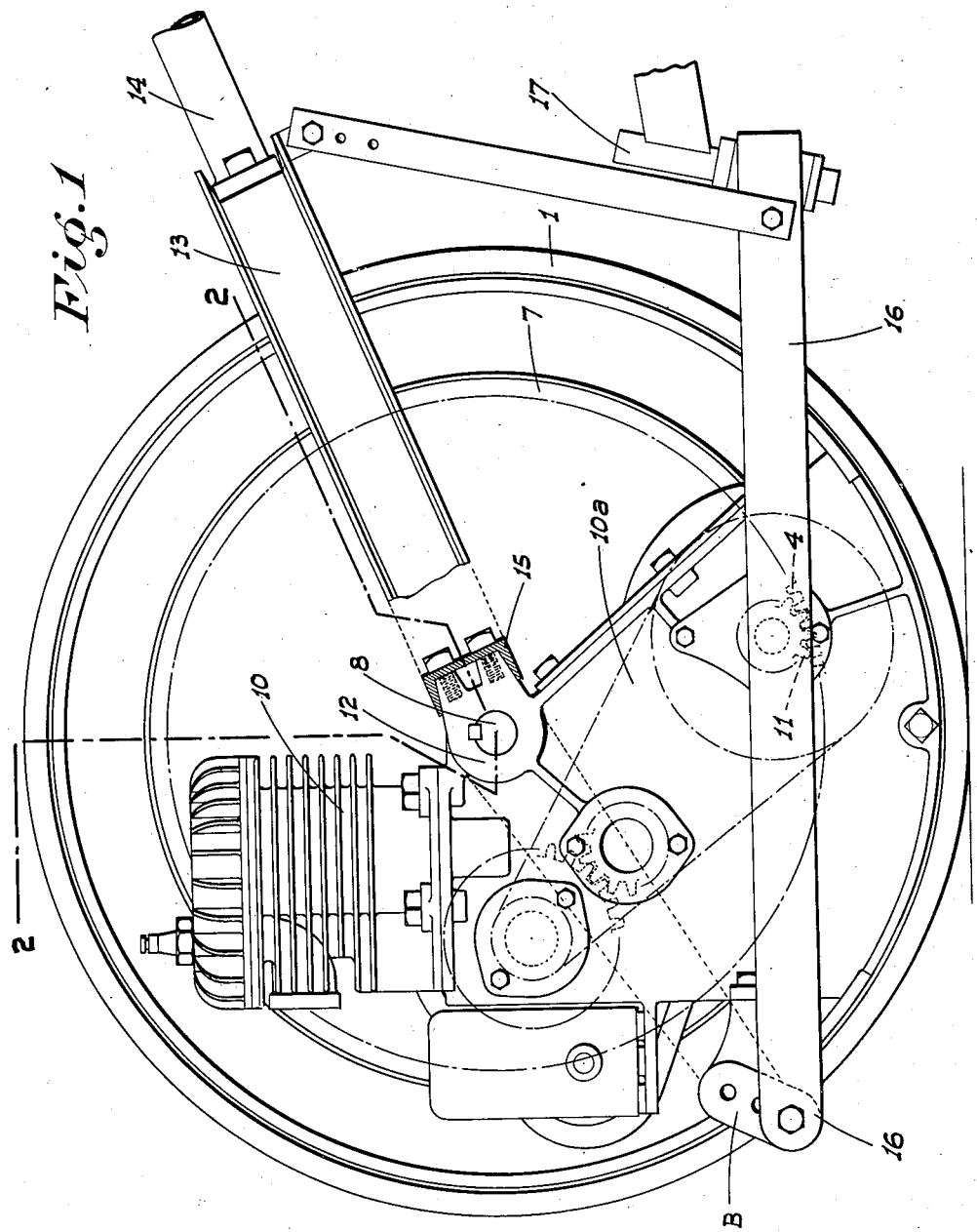

Patented Jan. 15, 1935

1,987,676

UNITED STATES PATENT OFFICE 1,987,676

ENGINE MOUNTING FOR TRACTOR ENGINES

Ralph N. Geffroy, Stockton, Calif.

Application November 6, 1933, Serial No. 696,828

4 Claims. (Cl. 180—19)

This invention relates to tractors and particularly to tractors of the small single wheel type such as are used for agricultural work on relatively small plots of ground. A tractor of this type is shown for instance in my Patent No. 1,807,784, the engine being enclosed within the wheel so that the entire structure is very compact.

The principal object of my present invention is to provide an improved mounting for the engine over what was previously shown, so that the weight thereof and the operating strains are distributed substantially equally over portions of the wheel axle itself and the hub of the wheel, in a very compact manner and so that all parts may be maintained relatively light in order to keep down weight of the entire structure to a minimum.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Figure 1 is a side elevation of the tractor, the engine accessories such as the carburetor etc. being omitted.

Figure 2 is a plan view of the tractor partly in section as on the line 2—2 of Figure 1.

Referring now more particularly to the characters of reference on the drawings, the wheel of the tractor comprises a relatively wide tire band 1 which is rigidly secured to arms 2 bent in at 3 to engage with ears 5 formed on the outer rim of an internal gear 4 and bolted thereto, so that the wheel and gear form in effect a single rigid unit. The gear has a solid web 6 on its outer side, while the upper portion of its inner side is closed by a plate 7, so that the teeth of the gear are enclosed within a dust-tight chamber.

The gear has an axial shaft 8 on which the hub 9 of the gear turns, said hub projecting from the web toward the opposite open side of the wheel, but terminating short of the corresponding end of the shaft.

The engine which is preferably of the single cylinder air cooled type indicated generally at 10, is disposed inside the wheel at the head of the axle and of course to one side of the gear 4. Said engine includes a driven pinion 11 journaled in connection with the crank case 10a of the engine, and engaging the internal gear in driving relation, said case forming the lower closing portion of the dust-tight chamber for the gear teeth.

The crank case of the engine is formed on its rear side adjacent the top with a boss 12 into which the exposed end portion of the shaft 8 beyond the gear hub projects, and which is rigidly keyed thereto as shown. The bottom of the crank case is curved concentric with the axial shaft and is disposed adjacent the wheel tire 1.

The boss also extends inwardly beyond said exposed portion of the shaft and turnably engages the adjacent portion of the gear hub forming a supporting bearing directly thereon, as plainly shown in Figure 2. Thus it is seen that not only is the engine mounted and supported directly on the hub of the tractor wheel and provided with generous bearing surface thereon, but is additionally supported and held in place by shaft 8, giving the engine nearly twice the working support the shaft alone provides. It is of great importance to observe the improvement of this construction. Not only is the engine better mounted but the pulling effort of the tractor wheel is better backed by the extra length of hub 9 against shaft 8, besides being extremely compact. The opposite end of the shaft, beyond the opposite end of the gear hub, is also rigidly keyed and secured in the adjacent side of a substantially horizontal manipulating frame 13 of U shape form which extends about the wheel on its rear side and is provided on its rear end with an extension bar 14 forming a handle whereby the machine may be steered.

On its open side said frame is bent laterally and inwardly of the wheel, as shown at 15, to extend along the rear side of the boss 12 to which it is bolted. In this manner when a vertical pressure is imparted to the frame 13 to raise and lower the same, a direct raising or lowering effort is also imparted to the engine itself, and to the forward extension of frame 13.

The forward end of the U frame on the shaft connected side is adjustably secured to the adjacent side of a horizontal bottom frame 16 which also extends about the rear of the wheel and which may be connected at said end to the upper frame 13. The open side of the frame 16 at its forward end is directly connected to the forward end of the crank case 10a by a bracket B. A king pin 17 is mounted in the rear end of the frame 16 and serves as a pivotal coupling for the implement supporting trailer, as shown in my co-pending application for patent, Serial No. 696,681, filed November 4, 1933. The king pin is easily removable and any farm tool, lawn mower, or utility wagon etc. may be attached directly to rear end of frame 16 if desired.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A tractor including a wheel, a gear fixed concentric with the wheel, an axial shaft on which the hub of the gear is turnable, an engine for driving the gear disposed within the wheel, said engine including a case, and a boss formed on the case, engaging and supported on the hub and the adjacent portion of the shaft.

2. A tractor including a wheel, a gear fixed concentric with the wheel, an axial hub on the gear, a shaft turnable in and projecting from one end of the hub, an engine for driving the gear disposed within the wheel, said engine including a case, and a boss formed on the case, said boss extending over and being secured to the projecting portion of the shaft and also extending over and turnably engaging the adjacent portion of the hub.

3. A tractor including a wheel, a gear fixed concentric with the wheel, an axial shaft on which the gear is turnable, said shaft at both ends projecting clear of the gear, an engine for driving the gear disposed within the wheel, means rigidly securing the frame of the engine to one end of the shaft, and a manipulating frame to which the other end of the shaft is rigidly secured.

4. A tractor including a wheel, a gear fixed concentric with the wheel, an axial shaft on which the gear is turnable, said shaft at both ends projecting clear of the gear, an engine for driving the gear disposed within the wheel, a boss formed on the frame of the engine and in which the adjacent end of the shaft is secured, and a manipulating frame extending about the wheel; the other end of the shaft being secured to the said manipulating frame.

RALPH N. GEFFROY.